(12) United States Patent
Shellhammer

(10) Patent No.: US 7,722,105 B2
(45) Date of Patent: May 25, 2010

(54) ANCHOR CAP FOR CHILD SAFETY SEAT

(75) Inventor: Alex Shellhammer, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 11/962,735

(22) Filed: Dec. 21, 2007

(65) Prior Publication Data
US 2008/0157552 A1 Jul. 3, 2008

Related U.S. Application Data

(60) Provisional application No. 60/877,748, filed on Dec. 29, 2006.

(51) Int. Cl.
B60N 3/00 (2006.01)

(52) U.S. Cl. .............. 296/37.8; 296/37.14; 296/65.03; 297/485; 280/801.1

(58) Field of Classification Search .............. 296/37.1, 296/37.5, 37.2, 37.8, 37.14, 40, 65.03, 61.1, 296/190.08; 297/485, 253; 280/801.1; 49/210, 49/212, 260
See application file for complete search history.

(56) References Cited

U.S. PATENT DOCUMENTS

| | | | |
|---|---|---|---|
| 5,098,162 A | 3/1992 | Forget et al. | |
| 5,746,449 A | 5/1998 | Hiroshige | |
| 5,800,005 A * | 9/1998 | Arold et al. | 296/37.12 |
| 6,267,442 B1 | 7/2001 | Shiino et al. | |
| 6,601,897 B2 * | 8/2003 | Stelandre et al. | 296/37.12 |
| 6,601,917 B1 | 8/2003 | Christopherson | |
| 6,666,504 B2 | 12/2003 | Guanzon et al. | |
| 7,441,823 B2 * | 10/2008 | Bertoli et al. | 296/68.1 |
| 2002/0104190 A1 * | 8/2002 | Moore et al. | 16/231 |
| 2007/0102463 A1 * | 5/2007 | Thomas | 224/275 |
| 2008/0111417 A1 * | 5/2008 | Ohta | 297/485 |

* cited by examiner

Primary Examiner—Jason S Morrow
(74) Attorney, Agent, or Firm—Mark E. Duell, Esq.; Emerson, Thomson & Bennett

(57) ABSTRACT

An article includes a cover member, which can reversibly slide between an open orientation and a closed orientation. The article includes at least one track member disposed on one or opposing sides of the cover member. The article includes at least one support structure adapted to be received by the at least one track member in a sliding relation. The article includes at least one vertical support structure disposed in a fixed position relative to the cover member and adapted to mate with a bottom surface of the cover member in a vertically supporting relation. The article includes at least one mechanical stop limiting the range of motion of the cover member in an opening direction.

20 Claims, 4 Drawing Sheets

ANCHOR CAP FOR CHILD SAFETY SEAT

This application claims priority to U.S. Provisional Patent Application Ser. No. 60/877,748 filed on Dec. 29, 2006 and now pending, which is hereby incorporated by reference in its entirety.

I. BACKGROUND OF THE INVENTION

A. Field of Invention

The present invention generally relates to devices and methods for covering and/or concealing vehicle components.

B. Description of the Related Art

It is known in the art to provide anchors or attachment means for various interior components of a vehicle interior. It is also known to provide a child's seat that can be selectively secured within an automobile for human infants that are too small to be safely secured by conventional three point safety belt and shoulder harnesses.

The present invention provides methods and apparatuses for an innovative anchor and cap for the anchor, so as to provide a convenient method and apparatus for securing a child seat or other object within a vehicle interior. Further, a cap is provided to selectively cover the anchor.

II. SUMMARY OF THE INVENTION

The present invention generally relates to an article for covering and/or concealing any of a variety of vehicle components. Some embodiments relate to articles for covering and/or concealing an anchor for a child safety seat.

Some embodiments relate to an article, comprising: a cover member having a top surface and a bottom surface spaced apart from the top surface and defining a thickness, the thickness being bounded by the top surface, the bottom surface and at least four sides, the cover member being adapted to reversibly slide between an open orientation and a closed orientation; at least one track member disposed on one or opposing sides of the cover member, and adapted to receive a support structure in a slideable relation; at least one support structure adapted to be received by the at least one track member in a sliding relation, the support structure comprising a pin, and the pin being in a fixed position relative to the cover member; at least one vertical support structure disposed in a fixed position relative to the cover member and adapted to mate with a bottom surface of the cover member in a vertically supporting relation, and limiting the range of motion of the cover member in a closing direction; and at least one mechanical stop limiting the range of motion of the cover member in an opening direction.

Other embodiments relate to a process for reversibly uncovering a component, comprising the steps of: contacting one edge of a cover member; applying an upward force to the one edge of the cover member; raising the cover member to angle sufficiently similar to a guiding surface so that the cover member is substantially free to slide relative to the guiding surface; and sliding the cover member over the guiding surface until the cover member contacts a mechanical stop.

Still other embodiments relate to a component concealment article, comprising: a covering means for concealing a component; a slide means for enabling motion of the covering means; a vertical support means for supporting the covering means; a containment means for containing an article to be concealed; and a stopping means for restricting the range of motion of the covering means.

Other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which are described in detail in this specification and illustrated in the accompanying drawings which form a part hereof and wherein.

DESCRIPTION OF THE INVENTION

Figure 1:
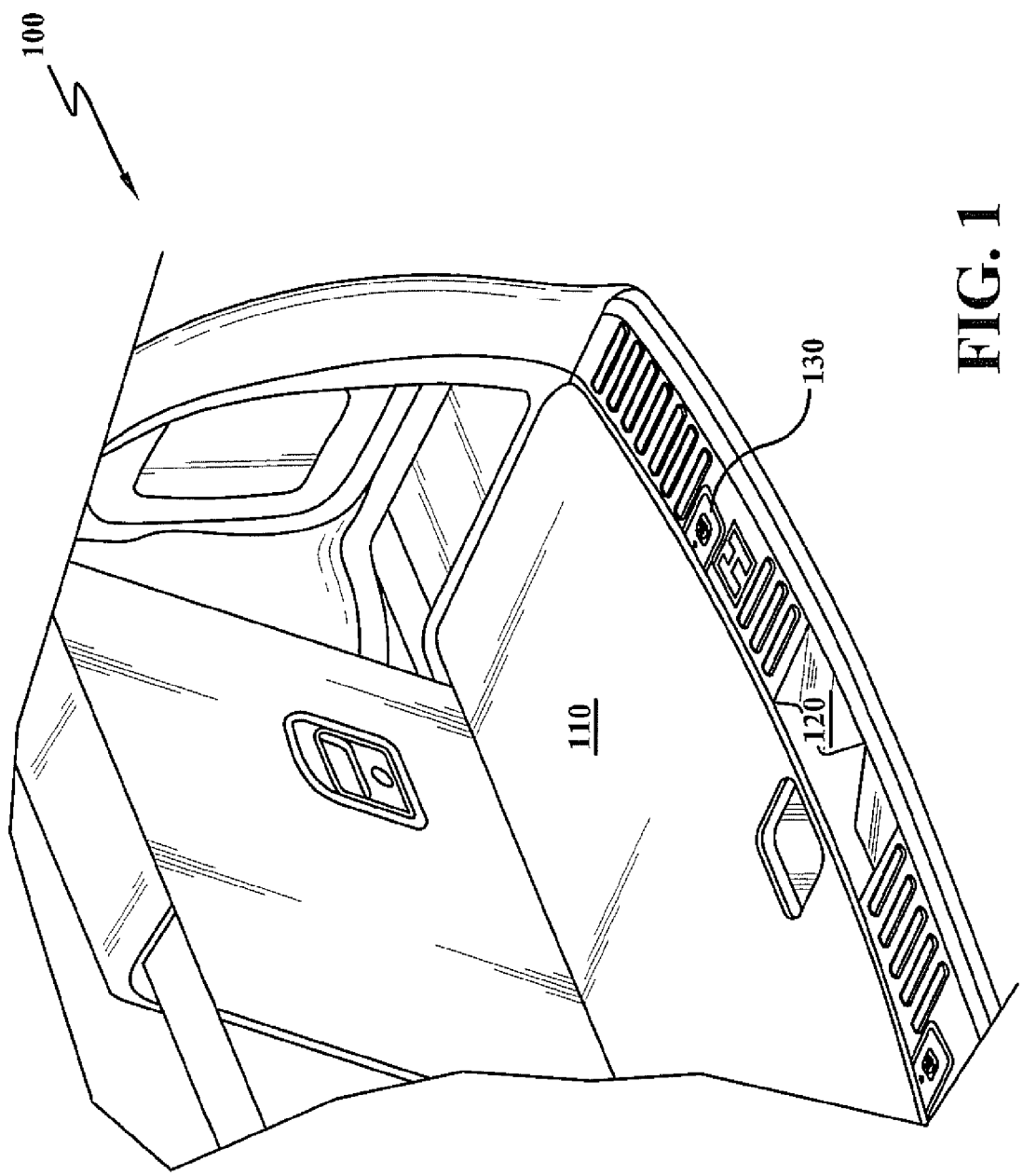
FIG. 1 is a perspective view of a portion of a representative vehicle interior showing a typical environment and location of an embodiment.

The present invention generally relates to covers for concealing some components from view in vehicles. Some embodiments further relate to slideable covers or cover assemblies for reversibly concealing such components from view.

One embodiment comprises a cover having a top face, a bottom face spaced apart from the top face and defining a thickness, and at least four sides bounding the thickness. Two opposing sides have one or more track members for allowing the cover to slide on a portion of a support structure, such as a pin, or a pair of opposing pins. Such portion of the support structure is adapted to mate with the one or more track members disposed on the sides of the cover.

According to some embodiments the cover is adapted to slide between an open orientation and a closed orientation. In a closed orientation, the one or more track members are in sliding communication with a portion of the support structure, such as a pair of opposing pins, and simultaneously in a vertically supported relation with a vertical support portion of the support structure. In some embodiments, the portion of the support structure that is in sliding communication with the one or more track members can also provide vertical support to at least a portion of the cover. An open orientation includes any orientation of the cover where the cover is not vertically supported by the vertical support structure. Accordingly, there is not a single open orientation, but rather a sliding scale of degrees of openness ranging from, but not including, the closed orientation, to an open orientation at the opposite end of the cover's range of motion, while remaining in sliding communication with a portion of the support structure.

In some embodiments, the cover may enclose and/or conceal from view, a cavity. Furthermore, some embodiments can include a cavity. A cavity can be bounded by one or more wall structures, and in some embodiments, may also include a floor structure. Furthermore, the cavity can contain any of a wide variety of components including, without limitation, anchor members, hooks, latches, or other devices. When the cover is in a closed orientation the cover is disposed over the cavity such that the cavity, and the contents thereof, is hidden from view. Similarly, when the cover is in an open orientation, the cover has slid toward the fully open end of its range of motion, thereby exposing the contents of the cavity and enabling access thereto.

In one embodiment, the cover comprises a substantially rectangular shape, although other shapes are also within the scope of the present invention including pentagons, hexagons, and higher polygons. The cover also has a top face and a bottom face, and the top face can include any of a variety of symbols for indicating the component or components concealed by the cover. For example, a cover concealing an anchor for a child safety seat could include a rendering of a child in a safety seat. According to some embodiments, a cover can also comprise four or more sides. Some embodiments can include one or more sides having an edge that is shaped to blend with another part of the vehicle so as to form a composite surface having relatively smooth lines. For example, an edge of a cover could be curved to match the curvature of a surface that is adjacent to such edge when the cover is in a closed orientation. In this way the cover can be made to blend with the other visible components, thereby producing a pleasing aesthetic effect. Covers can be made from any of a wide variety of materials including, without limitation, organic polymers, metals and/or alloys. In one embodiment, the cover is a molded polymer part.

Some embodiments also include one or more track members. Track members can be disposed on opposing sides of a cover, so that they are in a generally parallel relation to each other. Generally, a track member has a trough bottom and one or more trough walls, and extends so as to define a length. Suitable tracks can be straight or curved. A cross section taken perpendicular to a length of a track member could have any of a wide variety of shapes including, but not limited to, generally square, oblique, or curved. Appropriate cross sectional shapes depend in part upon the component to which they are intended to mate. Furthermore, in some embodiments, the track can comprise a single wall that wraps around one or both ends of the track thereby forming a pair of opposing walls connected at one or both ends of the track.

Track members can be made from any of a wide variety of materials including, without limitation, organic polymers, metals, and/or alloys. In some embodiments, one or more track members can comprise a part that is distinct from the cover, and is fastened or otherwise attached to the sides of the cover. In other embodiments, one or more track members can be different regions of a single part that includes the cover. For instance, the cover can be a molded part and the tracks can be formed therein. Still further, the track members can be made from the same material as the cover, or a different material.

Some embodiments also include a support structure. Portions of the support structure can mate to the one or more track members in a sliding relation. For example, one support structure can include a stationary pair of opposing pins. The pins can be disposed on opposite sides of a cavity, and can be capable of mating in a sliding relation with the one or more track members disposed on the cover. According to such embodiments, the pins are capable of receiving the track members in a sliding relation, and the pins therefore guide the motion of the cover. The mating end of a pin can have a variety of shapes including, without limitation, circular cylindrical, conical, spherical, ellipsoidal, or pyramidal. Furthermore, support structures can comprise any of a wide variety of materials including organic polymers, metal or alloys.

Some embodiments are adapted to seat on a portion of the support structure when the cover is in a closed orientation, so that the cover is vertically supported. Accordingly, the support structure can also include one or more vertical support members. A vertical support member functions to vertically support the cover. For example, when the cover is in a closed orientation, it can rest on the vertical support members. In some embodiments, vertical support members can also comprise one or more walls of a cavity. For instance, a cavity can comprise four walls, a floor surface and an open top defining a hollow cubical structure. The four walls may each have a top or supporting surface, upon which a cover can rest in a generally parallel relation to the cube floor surface, although other configurations would be apparent to one of skill in the art, and are thus within the scope of the present invention.

Some embodiments also include one or more spring members adapted to apply a force to the cover member, which tends to bias the cover member to moving toward an open orientation. For example, some embodiments can include such a spring in connection with a pressure-actuated latching mechanism located near one edge of the cover member. Accordingly, when a user applies a downward force to the edge of the cover member the latch is released and the spring forces the cover member to take on at least a partially open orientation. Such a mechanism is optional, and may assist a user in opening the cover assembly.

Some embodiments can also include a concealed region for receiving the cover member when the cover member is in an open orientation. The region may be defined by one or more walls. The walls can also include one or more mechanical stops for restricting the motion of the cover member, and/or one or more guiding surfaces for guiding the motion of the cover member.

Referring now to the drawings wherein the showings are for purposes of illustrating embodiments of the invention only and not for purposes of limiting the same, FIG. 1 shows an embodiment 100 comprising the rear portion of a hatchback vehicle. The vehicle is shown with the hatch open, exposing a rear cargo area 110 and a tailgate 120. The tailgate 120 also includes a cover assembly 130. Accordingly, FIG. 1 demonstrates a typical operating environment of cover assemblies of the present invention.

Figure 2:
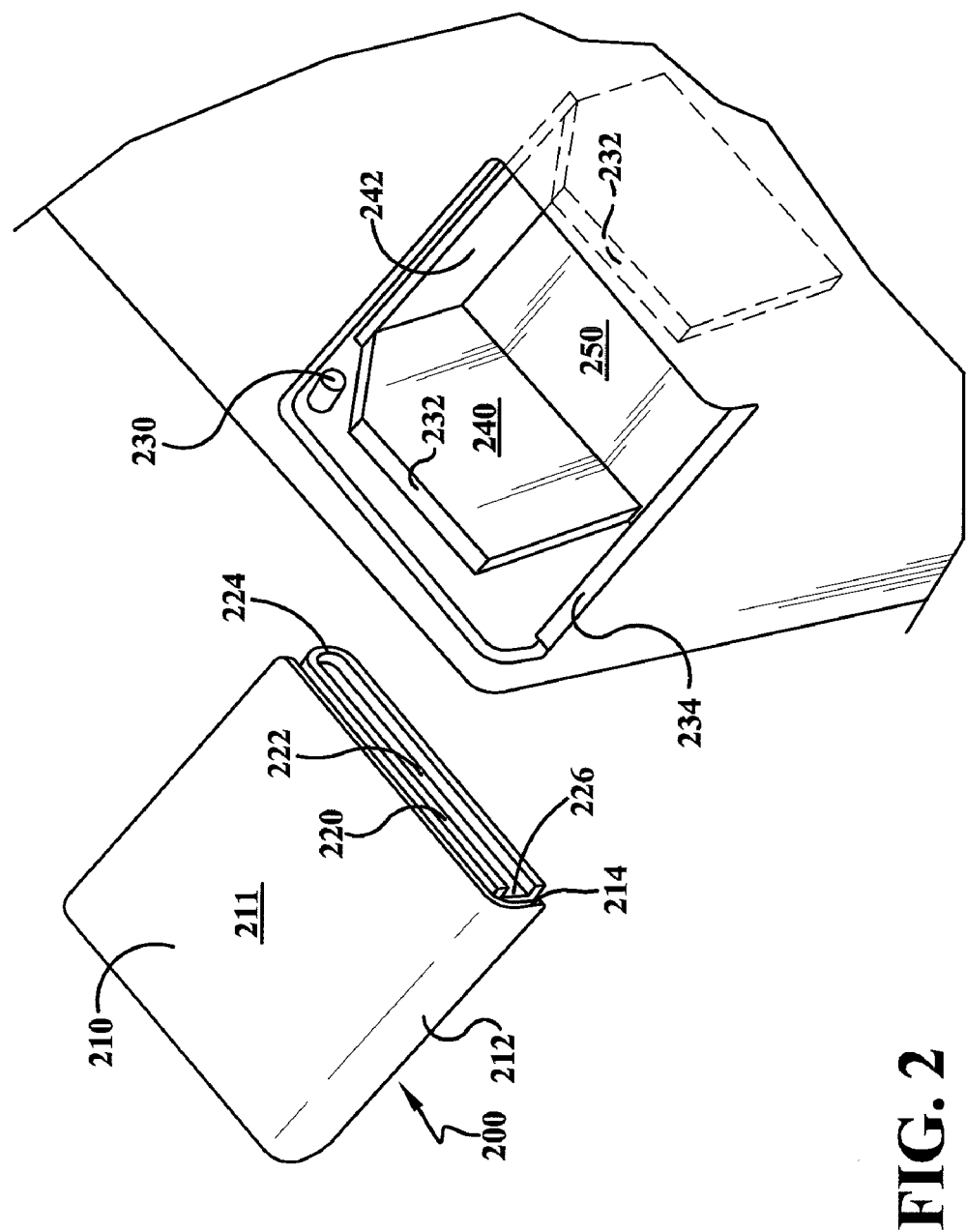
FIG. 2 is an exploded view of a cover assembly showing a cover member and related components.

FIG. 2 shows an embodiment 200 comprising a cover member 210 having a top surface 211, and four sides. One side 212 includes a curved shape. The embodiment 200 also includes a pair of tracks on opposing sides of the cover member. One side 214 is visible in the drawing and shows a track having a single wall 220 extending around nearly the entire perimeter of the track. One end 224 of the track is enclosed by the track 220 and an opposing end 226 is open. The track also includes a trough bottom surface 222 for receiving a pin-type support structure in a sliding relation. In this embodiment, the cross sectional shape of the track is a substantially square U-shape having flat sides 220 and a flat bottom 222, wherein the sides 220 are parallel to each other and the bottom 222 is at a right angle to the sides 220. Thus, an appropriately shaped pin-type support structure includes a circular right cylinder pin 230. According to FIG. 2, the pin 230 is received by the track on the side opposing side 214, and is therefore not visible in the drawing. Furthermore, a second pin opposing pin 230 is disposed on the opposite wall relative to pin 230, and is also not visible, but is received by the track on side 214. Thus, the tracks mate with the pin-type support structures in a sliding relation. Furthermore, according to this embodiment, the closed end 224 of the track prevents the cover member 210 from sliding out of, and/or detaching from, the support structure. One of skill in the art will recognize that the open end 226 of the track could be either open or closed like end 224.

FIG. 2 also shows two different vertical support structures. In this embodiment, the top surface 232 of the wall 240 is adapted to mate with and vertically support the underside of the cover member 210. Additionally, a top surface 234 of a housing is also adapted to support the cover member 210 vertically. One of skill in the art will recognize that surfaces 232 and 234 have redundant functions. Accordingly, in some embodiments one or the other may be absent or differently adapted so that it does not vertically support the cover member 210.

Also according to FIG. 2, the cover member 210 encloses and/or conceals a cavity defined by three walls 240, 242 (third wall not shown) arranged in a semi-rectangular relation, and a floor 250. In this embodiment, one wall defining the cavity is lower than the other two, and top surfaces 232 of the taller walls slant downward to meet the lower wall 242 thereby defining a slant shape. The slant shape enables the cover member to be lifted upward and slid partially behind the lower wall 242. In this embodiment, the cavity is not shown to contain and/or conceal other components; however, one of skill in the art will recognize that a similar structure could include a wide variety of components such as those set forth above.

Figure 3:
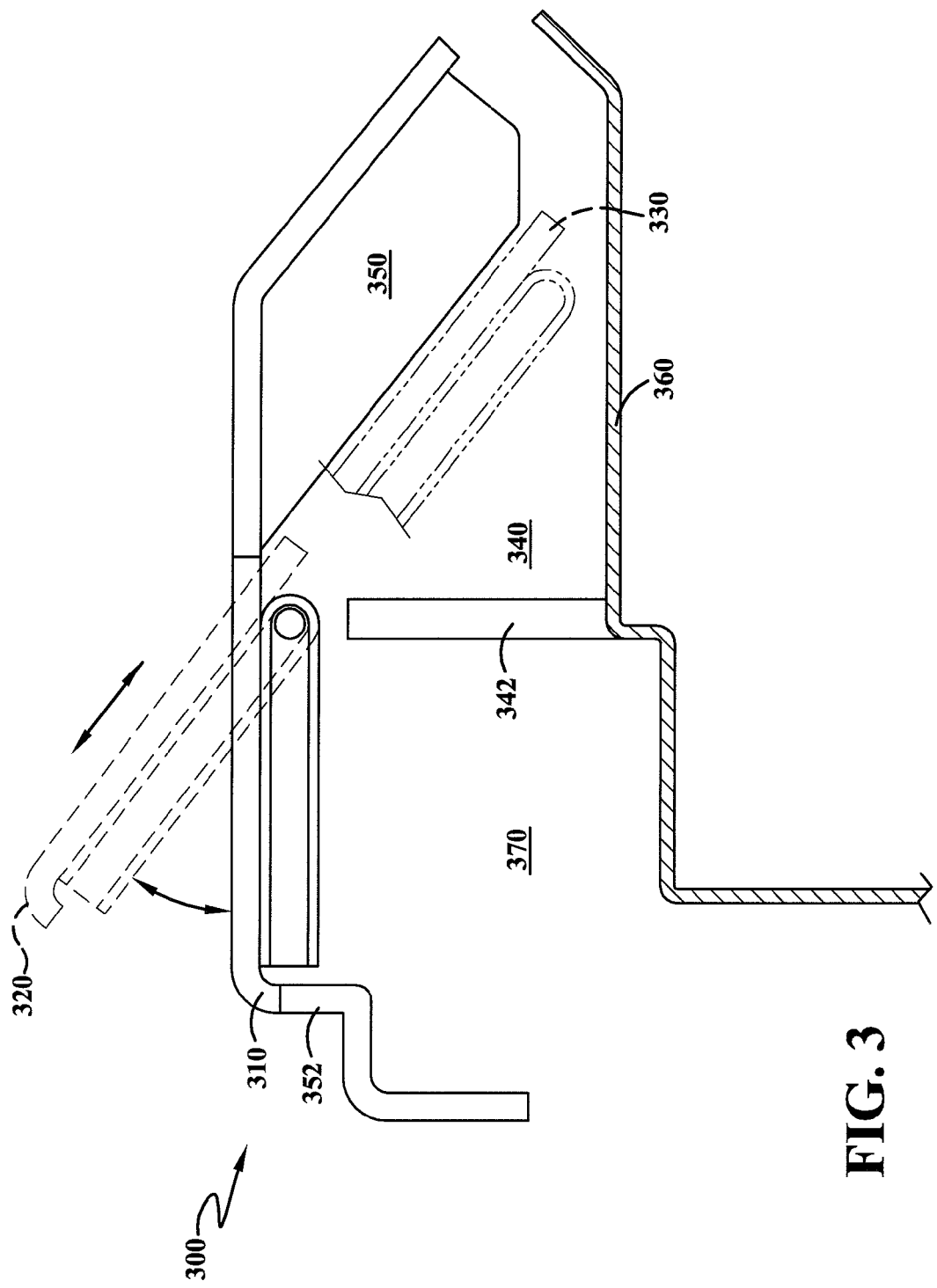
FIG. 3 is a cross sectional view of a cover assembly demonstrating three different orientations of the cover assembly including opened, closed, and an intermediate orientation.

Turning now to FIG. 3, an embodiment 300 is shown in cross section as an assembly, and the range of motion of the cover member is illustrated with three distinct orientations. According to this embodiment 300, a closed orientation 310 comprises the cover member resting and vertically supported by a housing 352. Internal vertical support structures can be present but are not shown. Orientation 320 shows the cover member lifted upward, but not yet slid along its tracks. In orientation 330 the cover member has been lifted upward and slid along its tracks until it occupies a portion of a space 340 behind a rear wall 342 of the cavity 370. According to this embodiment 300, the range of motion of the cover member is limited in part by a wall 350 and a floor 360. In this embodiment, the wall 350 additionally functions as a guiding surface to guide the motion of the cover member.

Figure 4:
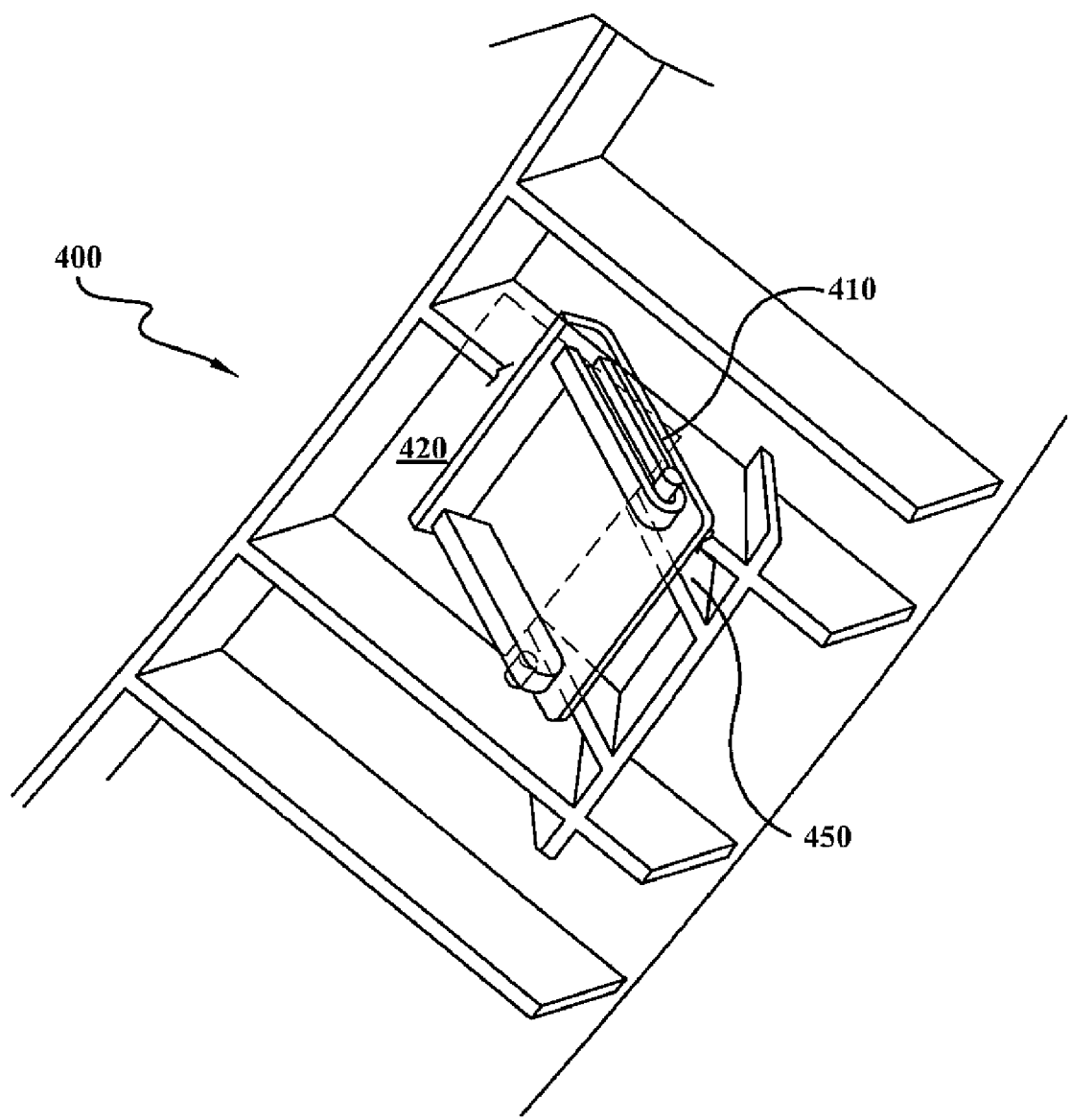
FIG. 4 is a bottom view of an embodiment showing a cover member in an open orientation with a cut-away view through the floor.

Turning now to FIG. 4, an embodiment 400 is shown from a position under the assembly looking upward through an invisible floor. A cover member 410 is shown in an open orientation exposing a cavity 420. A mechanical stop 450 is also shown, which limits the range of motion of the cover member. The mechanical stop 450 also functions as a guiding surface to guide the motion of the cover member. The floor surface of the cavity is see-through for the purpose of illustrating the embodiment.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. An article, comprising:
   a cover member having a top surface and a bottom surface spaced apart from the top surface and defining a thickness, the thickness being bounded by the top surface, the bottom surface and at least four sides, the cover member being adapted to reversibly slide between an open orientation and a closed orientation;
   at least one track member disposed on one or opposing sides of the cover member, and adapted to receive a support structure in a slideable relation;
   at least one support structure adapted to be received by the at least one track member in a sliding relation, the support structure comprising a pin;
   at least one vertical support structure disposed in a fixed position relative to the cover member and adapted to mate with a bottom surface of the cover member in a vertically supporting relation, and limiting the range of motion of the cover member in a closing direction; and
   at least one mechanical stop limiting the range of motion of the cover member in an opening direction.

2. The article of claim 1, wherein the cover member comprises a rectangular shape.

3. The article of claim 1, wherein the cover member comprises a top surface defining a curve at one or more edges, wherein the curvature of the cover matches the curvature of an adjacent component.

4. The article of claim 1, wherein the cover member comprises a material selected from the group consisting of organic polymers, metals, alloys and any combination thereof.

5. The article of claim 1, wherein the at least one track member comprises a portion of the cover member and together the cover member and the at least one track member comprising a single molded polymer part.

6. The article of claim 1, wherein the at least one track member comprises a part separate from the cover member, the at least one track member being affixed to the cover member.

7. The article of claim 1, wherein the at least one track member comprises a cross sectional shape having two parallel sides and one side perpendicular to the parallel sides, the perpendicular side not being parallel to any other side of the cross section.

8. The article of claim 1, wherein the at least one support structure comprises a pair of opposing pins spaced apart from each other and adapted to receive and/or be received by a pair of track members, the track members being disposed on opposing sides of the cover member.

9. The article of claim 1, wherein the at least one vertical support structure comprises an outer portion of a housing.

10. The article of claim 9, wherein the vertical support structure further comprises one or more walls that define a cavity.

11. The article of claim 1, further comprising at least one surface defining a cavity, the cavity being substantially enclosable by the at least one surface and the cover member such that the cavity is hidden from view.

12. The article of claim 1, further comprising at least one component disposed within the cavity and coverable by the cover member.

13. The article of claim 12, wherein the cover member further comprises a symbol on a top surface of the cover member, the symbol indicating the contents of the cavity enclosed by the cover member.

14. The article of claim 12, wherein the contents of the cavity comprise an anchor for a child safety seat, and wherein, a symbol comprises a rendering of a child in a safety seat.

15. A process for reversibly uncovering a component, comprising the steps of:
   providing a cover member having a top surface and a bottom surface spaced apart from the top surface and defining a thickness, the thickness being bounded by the top surface, the bottom surface and at least four sides, the cover member being adapted to reversibly slide between an open orientation and a closed orientation;
   providing at least one track member disposed on one or opposing sides of the cover member, and adapted to receive a support structure in a slideable relation;
   providing at least one support structure adapted to be received by the at least one track member in a sliding relation, the support structure comprising a pin;
   providing at least one vertical support structure disposed in a fixed position relative to the cover member and adapted to mate with a bottom surface of the cover member in a vertically supporting relation; and contacting a first side of the cover member;

applying an upward force to the first side of the cover member;

raising the cover member to angle sufficiently similar to a guiding surface so that the cover member is substantially free to slide relative to the guiding surface; and sliding the cover member over the guiding surface until the cover member contacts a mechanical stop.

16. The process of claim 15, further comprising identifying a component concealed by the cover member before the step of contacting, wherein the step of identifying includes recognizing at least one symbol disposed on a top surface of the cover member.

17. The process of claim 15, wherein the step of applying an upward force further comprises applying a biasing force to the cover member, which tends to move the cover member toward an open orientation.

18. An article, comprising:
a cover member having a top surface and a bottom surface spaced apart from the top surface and defining a thickness, the thickness being bounded by the top surface, the bottom surface and at least four sides, the cover member being adapted to reversibly slide between an open orientation and a closed orientation;

at least one track member disposed on one or opposing sides of the cover member, and adapted to receive a support structure in a slideable relation;

at least one support structure adapted to be received by the at least one track member in a sliding relation, the support structure comprising a pin; and at least one vertical support structure disposed in a fixed position relative to the cover member and adapted to mate with a bottom surface of the cover member in a vertically supporting relation, and limiting the range of motion of the cover member in a closing direction.

19. The article of claim 18, wherein the at least one track member comprises a portion of the cover member and together the cover member and the at least one track member comprising a single molded polymer part.

20. The article of claim 18, wherein the at least one support structure comprises a pair of opposing pins spaced apart from each other and adapted to receive and/or be received by a pair of track members, the track members being disposed on opposing sides of the cover member.

* * * * *